Dec. 10, 1935.  A. Y. DODGE  2,023,579
ROTATION CONTROL
Filed Nov. 3, 1930  3 Sheets-Sheet 1

Inventor:
Adiel Y. Dodge,
By
Jones, Addington, Ames + Seibold
Attorneys.

Dec. 10, 1935.   A. Y. DODGE   2,023,579
ROTATION CONTROL
Filed Nov. 3, 1930   3 Sheets-Sheet 2

Inventor:
Adiel Y. Dodge,
By
Jones, Addington, Ames & Seibold
Attorneys.

Dec. 10, 1935.  A. Y. DODGE  2,023,579
ROTATION CONTROL
Filed Nov. 3, 1930  3 Sheets-Sheet 3
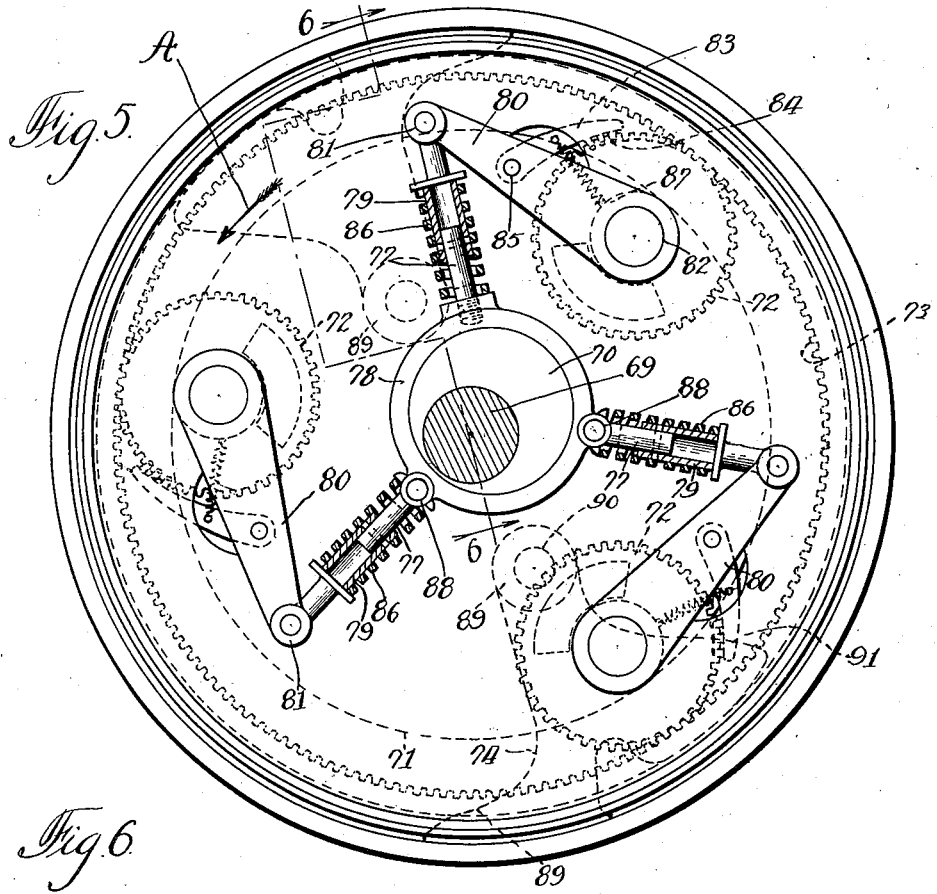
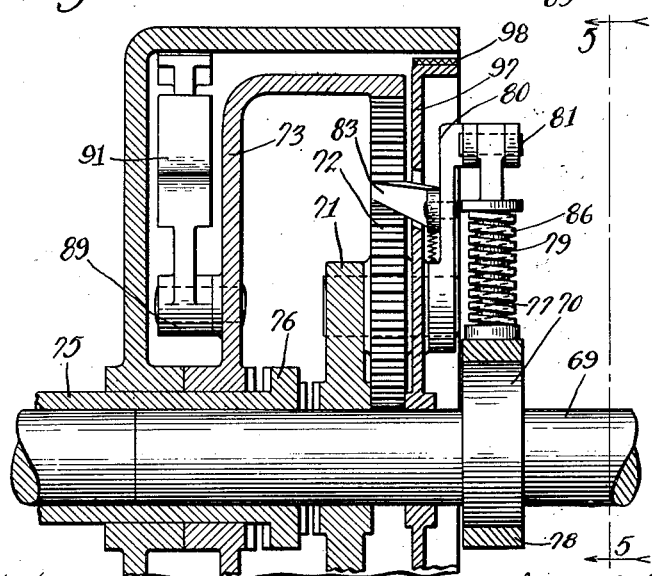
Inventor:
Adiel Y. Dodge
By Jones Addington Ames & Seibold
Attys.

Patented Dec. 10, 1935

2,023,579

UNITED STATES PATENT OFFICE 2,023,579

ROTATION CONTROL

Adiel Y. Dodge, South Bend, Ind.

Application November 3, 1930, Serial No. 492,971

6 Claims. (Cl. 74—144)

My invention relates to a rotation control and transmission and more particularly to adjustable controls for adjustably controlling the direction and speed of a driven member regardless of the direction of movement of the driving member.

In many instances it is desirable that a driven member, such as shaft, be rotatably driven in any desired direction from a driving member, which latter may be rotated in any desired direction relative to the driven member or which may be oscillated without changing the direction of rotation of the driven member, or it may be desirable to change the speed or direction of the driven member without changing either the speed or direction of the driver.

In my invention I have provided a mechanism which satisfactorily accomplishes all of these and other desirable results and in which the speed of the driven member is either under the control of the operator or is automatically balanced against the torque resistance.

I also provide a mechanism wherein energy expended ineffectively in an initial driving movement is later effectively used.

My invention includes a rotatable driving member having an adjustable crank pin thereon and means for adjusting the position of the crank pin relative to the axis of rotation to provide a variable crank radius. The device also includes a mechanism connected to and operable from the crank pin to drive the driven member at a substantially constant speed variable by the operator, or the driven member may be given an interrupted rotary motion at the will of the operator.

Further objects and advantages will be apparent from the specifications and the appended claims.

In the drawings:

Fig. 5 is a section substantially on the line 5—5 of Fig. 6, showing another form of my invention, and Fig. 6 is a section substantially on line 6—6 of Fig. 5.

Figures 1, 4:
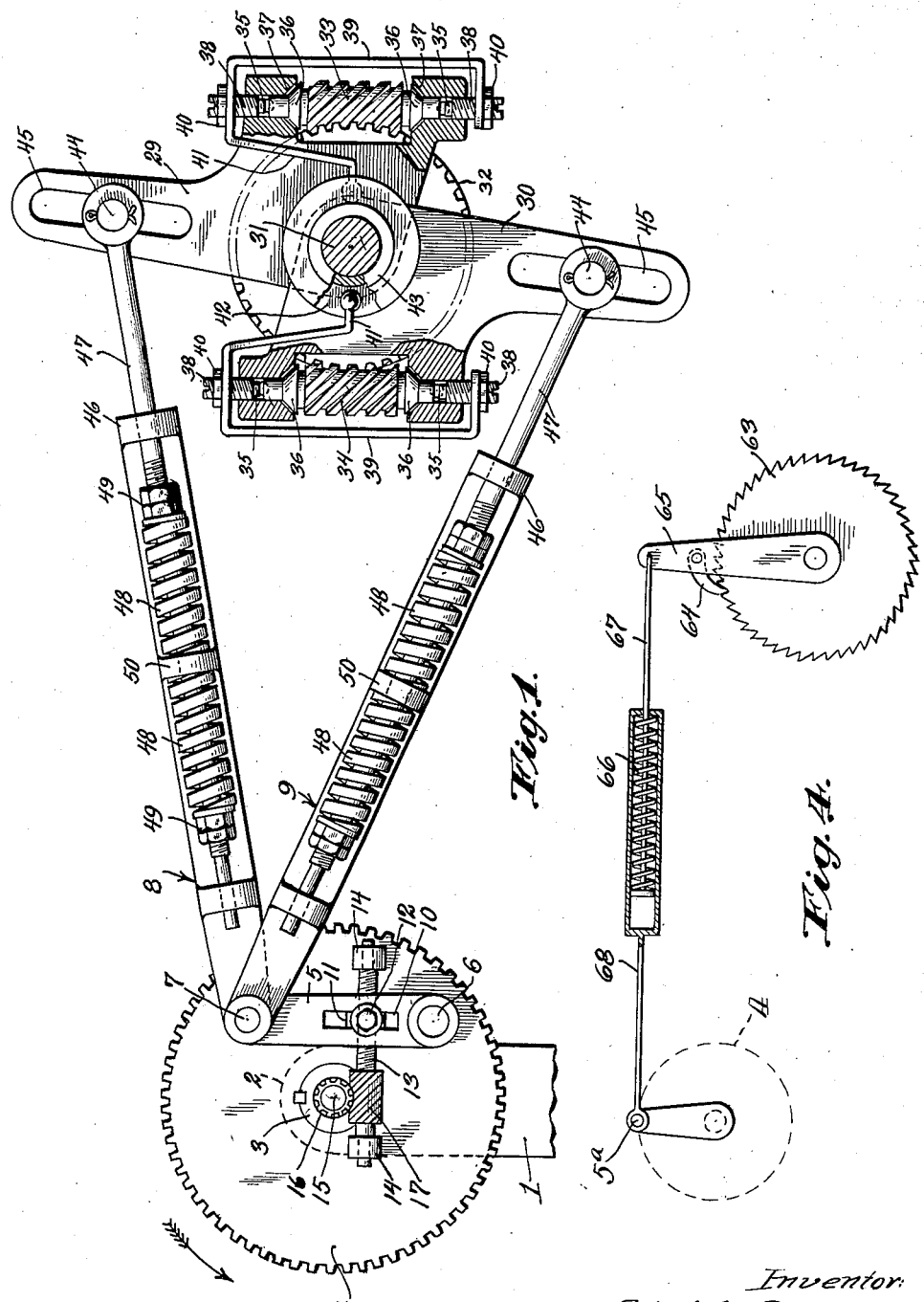
Figure 1 is a front elevation of a mechanism embodying my invention, a portion being broken away to better illustrate the operating mechanism.
Fig. 4 is a further modification in which a ratchet and pawl is used in place of the worm and gear shown in Fig. 1.

Referring to the drawings in detail, the embodiment illustrated comprises a frame 1 having a suitable bearing 2 in which is rotatably mounted a hollow shaft 3. A driving gear member 4 is secured to the hollow shaft and may be driven from any suitable source of power and in any desired direction.

An adjustable crank pin mechanism is mounted on the driving member 4 and comprises an arm 5 pivoted at 6, the free end of the arm being provided with a crank pin 7 on which suitable connecting rods 8 and 9 are mounted, the opposite ends of the rods being adjustably secured to that part of the transmission cooperating with the driven member and which will be later described.

The crank pin arm 5 is provided with a slot 10 and is held rigidly in any adjusted position by means of a threaded block 11 which is slidably mounted in the slot by means of a nut 12. The threaded portion engages a threaded shaft 13 mounted in suitable bearings 14 on the face of the gear 4.

The shaft 3 is hollow and a second shaft 15 extends therethrough and is rotatably mounted therein and provided with a spiral gear 16 engaging a similar spiral gear 17 on the threaded shaft 13. It is obvious that if the shaft 15 is rotated relative to the shaft 3, the crank-controlling shaft 13 will be rotated through the action of the spiral gears and the crank pin will be moved to and from the axis of the driven member, thereby decreasing or increasing the stroke of the connecting rods 8 and 9. It is also apparent that it is necessary to rotate the shafts 3 and 15 at the same speed to prevent movement of the crank pin. To accomplish the desired results, I provide a planetary mechanism between the shafts 3 and 15 comprising a sun gear 18 secured to the shaft 15 and planet gears 20 loosely mounted on studs 21 carried by a flange secured to the hollow shaft 3. The planet gears are in mesh with the sun gear 18 and a ring gear 22, which latter is mounted for free rotation on the hollow shaft 3 as shown. Springs 23 in the planet gear studs are arranged to press suitable brake shoes 24 against a disc-like flange 25 rigidly secured to the shaft 15.

A hand lever 25ª is pivoted on the frame 1 at 26 and is provided with brake shoes 27 and 28 for engagement with the ring gear 22 and the disc 25, respectively. The brake shoes 24, which are controlled by the springs 23 in the sun gear studs normally retain the shaft 15 and the shaft 3 in fixed relation to each other during the rotation of the driving gear 4. If the handle 25ᵃ is operated to engage and prevent the rotation of the ring gear 22, the shaft 15 will be driven through the gear 22, the planet gears 20 and the sun gear 18, at a speed relatively faster than the shaft 3 and gear 4. This difference in speed will cause the spiral gear 16 to rotate the crank-pin-controlling shaft 13 through the spiral gear 17 with which it is in mesh and the arm 15 will be operated to move the crank pin 7 relative to the axis of the shaft 15, thereby increasing or decreasing the stroke of connecting rods 8 and 9.

If the brake handle 25ᵃ is operated to cause the brake shoe 28 to engage and prevent the rotation of the disc 25, the shaft 15 will be held stationary and the continued rotation of the driving gear 4 and the mechanism just described will cause the crank-pin-controlling shaft 13 to be rotated to move the crank pin in the opposite direction. By operating the handle 25ᵃ to cause the engagement of one or the other of the brake shoes 26 and 27, the operator may control the device while it is in operation so that the crank pin 7 may be moved to any position relative to the axis and within the limits of the mechanism.

In order to drive a driven member by means of the mechanism just described, I provide oscillating arms 29 and 30 which are loosely mounted on a driven shaft 31. A worm gear 32 is rigidly secured to this shaft and is in mesh with worms 33 and 34 which are mounted for rotation on the oscillating arms 29 and 30. The worm shafts are slidably mounted in the arms and provided at each end with adjustable ball thrust bearings 35. Each end of each worm is also provided with a cone clutch member 36 arranged to engage a cooperating clutch face 37 on the supporting arm.

Ball bearing adjusting screws 38 are threaded into the oscillating arms for the purpose of adjusting the end thrust ball bearings so that the slight lost motion of the worms will cause either one or the other of the clutches to be engaged when the oscillating arm moves in one direction and so that the engaged clutch will be released and the clutch on the opposite end will be prevented from engagement and the worm will be free to rotate when the oscillating arm is moved in the opposite direction. By this means when the oscillating arm has moved in a driving direction, the corresponding clutch will be engaged and the worm will be prevented from rotating and will therefore drive the worm gear 32 to rotate the shaft 31, and when the oscillating arm moves in the opposite direction, the worm will freely rotate in mesh with the gear 31 until the clutch is again engaged on the return stroke.

In order that the driving relation of the worm 33 with the worm gear may be reversed at any time, the bearing adjusting screws 38 are locked to a yoke 39 by means of lock nuts 40 and an arm 41 is arranged to engage in a slot 42 in a longitudinally movable collar 43 on the shaft 31. When the collar 43 is moved longitudinally on the shaft the bearing screws 38 will be rotated and this movement will move the worm longitudinally to a position whereby either one or the other of the clutches 36 will be engaged during a desired part of the movement of the lever 29, the lost motion of the worm between the bearings being sufficient to allow the desired clutch to be engaged and the longitudinal adjustment will prevent the opposite clutch from engaging.

The connecting rods 8 and 9 are pivotally secured to the oscillating arms 29 and 30 by means of pins 44 adjustably mounted in slots 45. When the driving gear 4 is rotated in the direction of the arrow, both of the arms 29 and 30 will be moved forward, and if the worm clutch on the arm 29 has been adjusted by the movement of the collar 43 so that the clutch will be in engagement during this forward movement, the worm gear 32 and its associated shaft will be driven in the same direction as the driving gear 4 and during this movement the clutches controlling the movement of the worm 34 on the arm 30 will be so adjusted that the worm 34 will freely rotate and will engage during the return stroke to continue the rotation of the driven member during the time when the worm 33 is free to rotate.

The connecting rods 8 and 9 comprise telescopic members 46 and 47. Springs 48 are threaded on the member 47 and locked thereon under compression by means of lock nuts 49. The inner ends of the springs engage opposite sides of a lug 50 through which the rod 47 telescopes and these springs provide a connecting rod which is yieldable in both directions and which will have a tendency to flatten off the peaks of the impulses caused by variation in the linear velocity of the crank pin 7. The springs are so proportioned and the adjustment of the tension therein is such that they will deflect when the greatest difference in velocity exists between the driving and driven cranks and so that the flection will be converted into linear movement of the driven crank at the latter part of the stroke, also in case of considerable load on the driven shaft the springs will compress according to resistance, thus shortening the stroke and multiplying the torque and all of the energy stored in the spring will be effective during that part of the movement wherein the linear velocity of the crank pin is reduced.

Figures 2, 3:
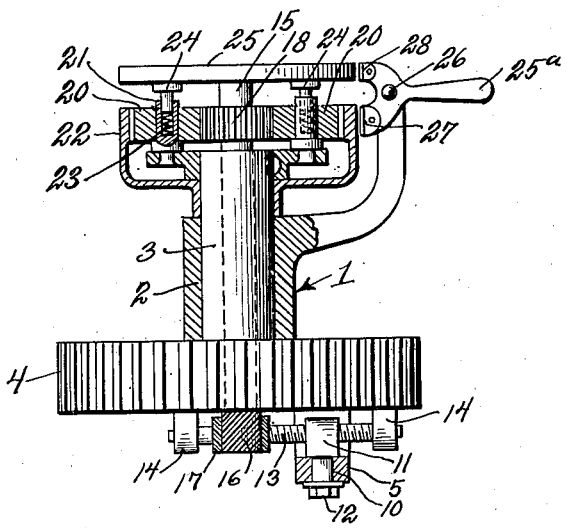
Fig. 2 is a top plan view of the driving means, a portion being broken away on a transverse axial plane to better illustrate the crank pin adjusting mechanism.
Fig. 3 is a transverse sectional detail view of a modified form of driven mechanism.

In Fig. 3, I have illustrated a modified form of driven mechanism comprising a driven shaft 51 having a pinion 52 thereon meshing with a gear 53 on a shaft 54. The driven shaft 51 is also provided with a pinion 55 meshing with a ring gear 56 on the hollow shaft 57 through which the shaft 54 extends. These shafts 54 and 57 are provided with worm gears 58 and 59, respectively. Worms 60 and 61, corresponding to the worms 33 and 34 in Fig. 1, are mounted on an oscillating arm 62 and are in mesh with the worm gears 58 and 59 and when the oscillating arm 62 is moved in one direction, the worm 60 will rotate the shaft 51 through the pinion 52, gear 53, the shaft 54 and the worm gear 58.

The worms are provided with clutches, similar to those shown in Fig. 1, and during the movement just described the worm 61 will be free to rotate and allow the rotation of the worm gears 59, and on the return stroke, the clutch of the worm 61 will be engaged and the shaft 51 will be driven in the same direction through the gear 55, the ring gear 56 and the shaft and worm gear 57 and 59, respectively, thus providing a continuous movement of the drive shaft 51 in one direction. The direction of rotation of the shaft 51 may, of course, be reversed as desired by reversing the clutching operation of the worms 60 and 61.

One of the functions of my spring impulse connecting rod is to provide a means to flatten off the sine curve impulses inherent to crank movements, thus securing a more constant torque in the driven shaft, particularly at lower speeds (i. e. at the greater reductions).

In Fig. 4 a modification is shown in which a ratchet wheel 63 and pawl 64 on a pawl arm 65 is used instead of the worm mechanism just described and a compression spring 66 is inserted in the connecting rod between the telescopic members 67 and 68. By this construction where an extremely heavy load is on the driven shaft, all the energy stored in the spring is returned to the driver on the next half stroke and without disturbing negative impulses.

In Fig. 4, I have shown a completely automatic transmission. The crank arm may be of a fixed length, having a constant stroke, with the connecting rod variable. The spring 66 is automatically compressed by the load it is carrying. The compression of spring 66 lengthens (or shortens, as the case may be) the connecting rod, thus shortening the effective stroke; hence, the heavier the load the fewer number of teeth in the ratchet wheel will be advanced. Thus a slower speed is imparted to the driven shaft as it will advance a lesser distance per stroke (or unit time). I prefer to make the spring so that it will completely close to a dimension such that the maximum length of the connecting rod will be such that it will cause one (or more) teeth of the ratchet wheel to advance each stroke, thus securing a positive drive at the slowest speed desired (or greatest mechanical advantage) and a full range of speeds from the positive low, up through automatic intermediate speeds to the highest speed which may be 1:1, if arm 5a is made the same length as arm 65.

The construction shown in Figs. 5 and 6 comprises a driving shaft 69 which may be the shaft of an internal combustion engine, for use in driving an automobile, an eccentric 70 keyed to this shaft, a gear carrier 71, planetary gearing 72 mounted on this gear carrier, transmission between the eccentric and planetary gearing, a ring gear 73 meshing with the planetary gearing, a one-way reactance clutch 74 for preventing rotation of the ring gear in one direction only, and a driven member 75 having a clutch head 76 which may be either in neutral, as shown in Fig. 6, or connected with the gear carrier 71 for all forward speeds of the automobile, or connected with the ring gear 73 for reverse.

Transmission between the eccentric and the planetary gearing comprises a master connection with one of the planetary gears and an auxiliary connection with the other of the two planetary gears. Referring first to the master connection, this comprises an extensible spring connected rod having a stud portion 77 rigidly secured to the eccentric strap 78, and a sleeve portion 79 telescopically engaging this stud, a rock arm 80 pivotally secured to the telescoping sleeve at 81 and rockable about the pivot pin 82 on which the planet gear 72 is mounted, and a pawl 83 having teeth 84 for engagement with the teeth of the planet gear 87 and pivotally mounted on the rock arm at 85. A heavy compression spring 86 may be provided tending to hold the extensible connecting rod in extended position. A light tension spring 87 may be provided tending to hold the pawl in operative relation with respect to the planet gear. The auxiliary connecting rods are similar in construction to that just described except that instead of being rigidly connected with the eccentric strap, they are pivotally connected therewith at 88 in order to enable the connecting rods to make the necessary accommodations required by the relative movements of the parts.

The one-way reactance clutch may comprise a pair of friction shoes 89 pivotally mounted on the ring gear at 90 and having curved friction surfaces shaped to permit rotation of the ring gear in the direction of the arrow A but so as to prevent reverse rotation thereof. These friction shoes may be counterweighted in such a manner that when the ring gear attains a predetermined speed, this counterweight 91 will cause the friction shoes to move out of engagement with the friction surface of the gear housing, thus permitting free rotation of the ring gear. Light springs 92 may be provided to hold the friction shoes in engagement with the friction surface until moved out of engagement therewith by centrifugal force. Means of the type shown in my copending application Serial No. 493,950, filed November 7, 1930 may be provided for manually moving the friction shoes out of engagement with the friction surface for reverse rotation of the ring gear when desired.

Means may be provided for holding the gear carrier 71 in order to effect reverse rotation of the ring gear 73, these means comprising a drum 97 secured to the pins 82 on which the planet gears 72 are mounted, and a clutch band 98 engageable with the drum 97 to hold it against rotation when desired.

In operation, for forward speeds, the clutch head 76 is shifted to the right to connect it with the gear carrier 71. As the engine shaft rotates, it will cause reciprocating motion of the connecting rods because of their connection with the eccentric. This will cause motion back and forth of the rock arms 80 which will cause rotation of the planet gears 72 because of the engagement therewith of the pawls 83. This rotation of the planet gears will cause a rotation of the gear carrier in the direction of the arrow A, since the ring gear 73 is held against rotation by the reactance clutch. The stroke of the rock arm will be in general inversely proportioned to the resistance to rotation of the gear carrier 71, since the greater this resistance the more the compression spring will be compressed on the power stroke and the shorter will be this power stroke. Thus the speed will be reduced to take care of an increased load, the stroke of the rock member being automatically varied inversely with the load.

As the gear carrier 71 increases in speed, there will come a time when the ring gear itself will begin to rotate due to the tangential component on the rock arm 80 of the thrust exerted on the connecting rod. The ring gear will continue to increase in speed under the action of these impulses until it may rotate at the same speed as the gear carrier and crank shaft, at which speed there will be no relative movement of the various parts of the transmission, the whole transmission then rotating as a unit.

For reverse rotation, the clutch head 76 is shifted to the left to connect it with the ring gear 73 and the clutch band 98 is tightened to hold the drum 97 and the gear carrier 71 against rotation. Under these conditions, rotation of the planet gear 72 will cause a rotation of the ring gear 73 in a direction the reverse of the drive shaft 69.

My invention may be modified without departing from the spirit of the invention, and I desire to be limited only by the prior art and the appended claims.

Having thus described my invention, what I claim and desire to secure by Letters Patent is:

1. A transmission comprising a rotatable worm gear, an oscillatable member coaxial with said worm gear and a transmission from said oscillatable member to said rotatable gear comprising a worm carried by and rotatable on said oscillatable member and engaging said worm gear, and means for selectively controlling the direction of rotation of said worm while said oscillatable member is oscillating comprising a member co-axial with said worm gear.

2. A clutch mechanism comprising a gear, a worm meshing with said gear, movable thrust members for positioning said worm whereby relative angular movement between said gear and worm is effected in either of two directions, stationary thrust members adapted to contact with thrust surfaces at the ends of said worm, bearings forming the sole support for said worm arranged outwardly of said thrust surfaces, and means for simultaneously moving said movable members for engagement of a stationary thrust member with either of said thrust surfaces for increasing resistance to angular movement of said worm whereby said relative angular movement is limited to one of either of said directions.

3. In a power transmitting device having a driving and a driven element for a machine, a safety clutch mechanism comprising a worm mounted on one of said elements, a gear on the other of said elements and meshing with said worm, thrust members for said worm whereby the same is positioned to effect a driving connection between said driving and driven elements, thrust elements adapted to move and position said worm to disengage said driving connection, and shipper mechanism connected as a unit with each of said thrust elements and readily accessible to the operator of said machine for simultaneously moving said thrust elements to effect said disengagement.

4. In a power transmitting device having a driving and driven element, a safety clutch mechanism comprising a worm mounted on one of said elements, a gear on the other of said elements and meshing with said worm, a movable thrust member at each end of said worm for selectively moving the worm in either direction longitudinally, a stationary thrust member at each end of the worm adapted to cooperate with a thrust surface on the adjacent end of the worm, and unitary means for simultaneously moving said movable thrust members in either direction to cause the gear and worm to idly rotate relatively to each other or be locked for rotation together as desired.

5. In a power transmission having a rotatable worm gear, an oscillatable member, and a worm rotatably carried by said oscillatable member and meshing with said worm gear; means for selectively controlling the direction of rotation of said worm comprising means for controlling the axial position of said worm, a member movable axially of the worm gear and connections between said means and member whereby the position of the worm is controlled in accordance with the position of said member.

6. In a power transmission having a rotatable worm gear, an oscillatable member, and a worm rotatably carried by said oscillatable member and meshing with said worm gear; means for selectively controlling the direction of rotation of said worm comprising a movable thrust member at each end of the worm for positioning the worm longitudinally, means for simultaneously moving said thrust members, and a member movable axially of the worm gear and connected to said means whereby the position of the worm is controlled in accordance with the position of said last named member.

ADIEL Y. DODGE.